(12) United States Patent
Tam (10) Patent No.: US 12,316,929 B2
(45) Date of Patent: May 27, 2025

(54) CAMERA MODULE ON FLEXIBLE INTERCONNECT TAPE

(71) Applicant: Meta Platforms Technologies, LLC, Menlo Park, CA (US)

(72) Inventor: Samuel Tam, Daly City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 186 days.

(21) Appl. No.: 17/870,581

(22) Filed: Jul. 21, 2022

(65) Prior Publication Data

US 2024/0098348 A1   Mar. 21, 2024

(51) Int. Cl.
*H04N 23/51* (2023.01)
*G02B 27/01* (2006.01)
*H04N 23/53* (2023.01)
*H04N 23/54* (2023.01)

(52) U.S. Cl.
CPC ......... *H04N 23/51* (2023.01); *G02B 27/0172* (2013.01); *H04N 23/53* (2023.01); *H04N 23/54* (2023.01); *G02B 2027/0138* (2013.01); *G02B 2027/0178* (2013.01)

(58) Field of Classification Search
CPC ........ H04N 23/51; H04N 23/53; H04N 23/54; G02B 27/0172; G02B 2027/0138; G02B 2027/0178
See application file for complete search history.

(56) References Cited

U.S. PATENT DOCUMENTS

| | | | |
|---|---|---|---|
| 9,088,705 B1* | 7/2015 | Tam | H04N 23/57 |
| 9,241,097 B1* | 1/2016 | Tam | H10F 77/93 |
| 9,681,032 B1* | 6/2017 | Tam | H04N 23/54 |
| 9,838,599 B1* | 12/2017 | Tam | H04N 23/45 |
| 9,848,111 B1* | 12/2017 | Pang | H04N 23/57 |
| 2010/0066393 A1* | 3/2010 | Bottoms | G01R 1/06711 |
| | | | 324/755.05 |
| 2012/0112347 A1* | 5/2012 | Eckhardt | H01L 25/0657 |
| | | | 257/751 |
| 2015/0351690 A1* | 12/2015 | Toth | A61B 5/14542 |
| | | | 600/391 |
| 2019/0333109 A1* | 10/2019 | Teller | G06Q 30/0267 |
| 2022/0102417 A1* | 3/2022 | Park | H04N 23/54 |
| 2022/0385796 A1* | 12/2022 | Tam | H01L 27/14625 |
| 2022/0407987 A1* | 12/2022 | Han | H04N 23/55 |

OTHER PUBLICATIONS

Co-pending U.S. Appl. No. 17/884,837, inventor Tam; Samuel, filed Aug. 10, 2022.
Non-Final Office Action mailed Jan. 25, 2024 for U.S. Appl. No. 17/884,837, filed Aug. 10, 2022, 8 pages.

* cited by examiner

*Primary Examiner* — Twyler L Haskins
*Assistant Examiner* — John H Morehead, III
(74) *Attorney, Agent, or Firm* — Freestone Intellectual Property Law PLLC; Aaron J. Visbeek (57) ABSTRACT

A camera module includes an image sensor die, high-density interconnect (HDI) tape, and a number of passive electronic components. The image sensor die has a first side and a second side. The first side includes a pixel array, and the second side includes a number of bonding pads. The HDI tape is a flexible substrate coupled to the image sensor. The HDI tape includes a number of traces positioned between a first side and a second side. The first side of the HDI tape is coupled to the second side of the image sensor die. The passive electronic components are coupled to the second side of the HDI tape and provide rigidity to the camera module.

19 Claims, 10 Drawing Sheets

CAMERA MODULE ON FLEXIBLE INTERCONNECT TAPE

TECHNICAL FIELD

This disclosure relates generally to camera modules and in particular to camera module fabrication.

BACKGROUND INFORMATION

Various wearable products include cameras. As smaller and lighter-weight product designs emerge, product manufacturers are requesting increasingly smaller camera sizes.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and fabrication methods for a camera module on a flexible interconnect tape are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Next generation products will be designed for camera modules that have smaller dimensions. Camera module dimensions may include stack height, length, and width. Examples of products that may benefit from smaller camera modules may include augmented reality (AR) glasses and virtual reality (VR) glasses.

A camera module's physical package dimensions may be reduced from those of existing cameras, by fabricating the camera module using high-density interconnect (HDI) tape. The camera module includes an image sensor die, a segment of HDI tape, and passive electronic components coupled together to form the camera module, according to an embodiment.

The image sensor die may be electrically coupled to a second side (e.g., a top side) of the HDI tape with gold stud bumps. The gold stud bumps may be used to couple bonding pads of the image sensor to exposed portions of traces of the HDI tape. The image sensor die may be configured as a flip chip die to reduce the stack height of bonding, for example, a wire bond die. The image sensor die may be bonded to the HDI tape using, for example, thermo-sonic (TS) bonding or thermo-compression (TC) bonding. The image sensor die may be a wire bond die that has been converted to a flip chip configuration using Through Silicon Vias (TSVs), in accordance with embodiments of the disclosure. Molding may be applied over at least part of the image sensor die to protect the image sensor die and couple the image sensor die to the HDI tape. The molding and HDI tape may be sized to approximately the same footprint (e.g., length and width) of the image sensor die to maintain reduced dimensions of the overall camera module package.

The HDI tape may be a flexible interconnect tape having an image sensor end, a connector end, and a flexible interconnect section. The HDI tape may include traces that extend from the image sensor end to the connector end through the flexible interconnect section. The traces electrically couple the image sensor to a connector to enable external circuitry to access or communicate with the image sensor die. The HDI tape may include flexible insulator layers (e.g., 4 layers, 6 layers, etc.) that enclose the traces. The flexible insulator layers may be flexible polymer films. The connector may be coupled to the HDI tape and may include a number of connection pads.

The passive electronic components may be coupled to a second side (e.g., a bottom side) of the HDI tape. The location of the passive electronic components may be just opposite to the image sensor die on the HDI tape, so that the image sensor die and the passive electronic components are on the image sensor end of the HDI tape. The passive electronic components may include, resistors, capacitors, inductors, and diodes, for example. The passive electronic components may be electrically coupled to the HDI tape using, for example, a solder paste. The passive electronic components may be covered with a layer of molding. The layer of molding may physically couple the electronic components to the HDI tape and may provide protection to the components. The layer of molding may add rigidity to the image sensor end of the camera module and may thermally conduct and dissipate heat from the image sensor die and the passive electronic components.

The apparatus, system, and methods of fabrication for a camera module on a flexible interconnect tape are described in this disclosure and enable manufacture of a low profile camera module to support operations of, for example, AR and VR glasses. These and other embodiments are described in more detail in connection with FIGS. 1-6.

Figure 1A:
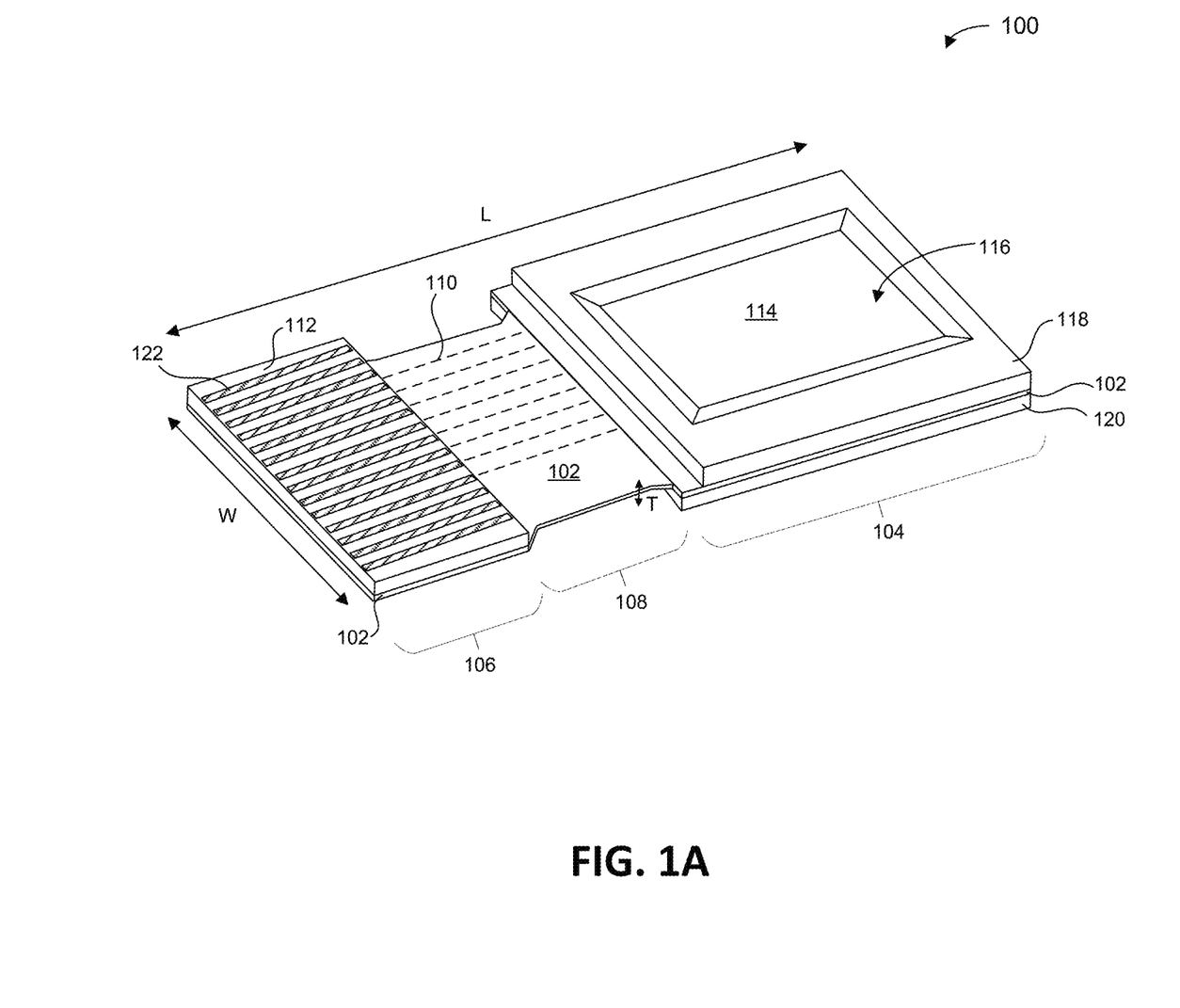
FIG. 1A illustrates a perspective view of a camera module that is fabricated with flexible interconnect tape, in accordance with aspects of the disclosure.

FIG. 1A illustrates a perspective view of a camera module 100 that is fabricated with flexible interconnect tape 102, in accordance with aspects of the disclosure. Camera module 100 is configured to provide a small footprint that is approximately the same as the footprint of an image sensor die to support, for example, head mounted display (HMD) applications, according to an embodiment. Camera module 100 includes a sensor end 104, a connector end 106, and a flexible interconnect section 108 that couples the sensor end 104 to connector end 106, according to an embodiment. Implementations of camera module 100 provide a small-sized, lightweight, and low-profile package that can be fabricated from existing wire bond image sensor dice or from flip chip image sensor dice. Camera module 100 includes a flexible interconnect tape 102 that extends from an image sensor end 104 to a connector end 106, according to an embodiment. Camera module 100 includes a flexible interconnect section 108 that couples image sensor end 104 to connector end 106, using flexible interconnect tape 102, according to an embodiment.

Flexible interconnect tape 102 is configured to electrically couple, one or more electronic components to one or more other electronic components, according to an embodiment. Flexible interconnect tape 102 may be implemented as a segment of high-density interconnect (HDI) tape, according to an embodiment. Flexible interconnect tape 102 includes a thickness T, a width W, and a length L. Thickness T may be approximately 0.13 mm to 0.18 mm. Thickness T of flexible interconnect tape 102 may vary based on a number of layers (e.g., 4 layers, 6 layers, etc.) from which it is fabricated. For example, flexible interconnect tape 102 may include a top layer and a bottom layer that enclose a number of traces 110. The layers may be flexible insulator layers of flexible polymer films. Flexible interconnect tape 102 may include 4 layers, 6 layers, or more layers to enclose and sandwich one or more of layers of traces 110. Traces 110 couple image sensor end 104 to connector end 106, according to various embodiments. Width W of flexible interconnect tape 102 may vary from one end to another. Width W of flexible interconnect tape 102 may be a width of a connector 112 on connector end 106, may be a width of flexible interconnect section 108, and may be a width of image sensor end 104, according to various embodiments. Length L may include a length of image sensor end 104 (e.g., a length or width of an image sensor die), plus a length of connector 112, plus a length of flexible interconnect section 108.

Image sensor end 104 of camera module 100 includes a partially enclosed image sensor die (shown as image sensor die 124 in FIGS. 1B and 1C) coupled to flexible interconnect tape 102, according to an embodiment. Image sensor die includes a pixel array 114 that may be exposed by an opening 116. Opening 116 may be an aperture in molding 118. Molding 118 may be disposed on flexible interconnect tape 102 and at least partially on the image sensor die. Molding 118 is disposed over the image sensor die to protect image sensor die, to adhere the image sensor die to flexible interconnect tape 102, and to immobilize the image sensor die, according to an embodiment. Molding 118 may be applied using transfer molding processes, and molding 118 may include molding materials such as: acrylic, acrylonitrile butadiene styrene (ABS), nylon polyamide (PA), polycarbonate (PC), polyethyelene (PE), polyoxymethylene (POM), polypropylene (PP), polystyrene (PS), thermoplastic elastomer (TPE), and thermoplastic polyurethane (TPU), according to various embodiments. Molding 118 is disposed on a first surface (e.g., a top surface) of flexible interconnect tape 102, according to an embodiment.

Camera module 100 includes a molding 120 that is applied to a second surface (e.g., a bottom surface) of flexible interconnect tape 102 on image sensor end 104, according to an embodiment. Molding 120 at least partially encapsulates a number of electronic components that are coupled to the second surface of flexible interconnect tape 102. Molding 120 provides rigidity to image sensor end 104, protects the image sensor die from being bent or broken, and provides thermal dissipation away from the electronic components, in an embodiment. The electronic components may be passive electronic components and may include resistors, capacitors, inductors, and diodes, for example.

Connector end 106 includes a portion of flexible interconnect tape 102, connector 112, and a number of pads 122. Pads 122 are electrically conductive pads that are coupled to traces 110. Pads 122 are electrically coupled to the image sensor die that is positioned on image sensor end 104 and provide an external interface to various connections of the image sensor die (power, ground, data, communications, configuration, diagnostics, etc.), according to an embodiment.

Figure 1B:
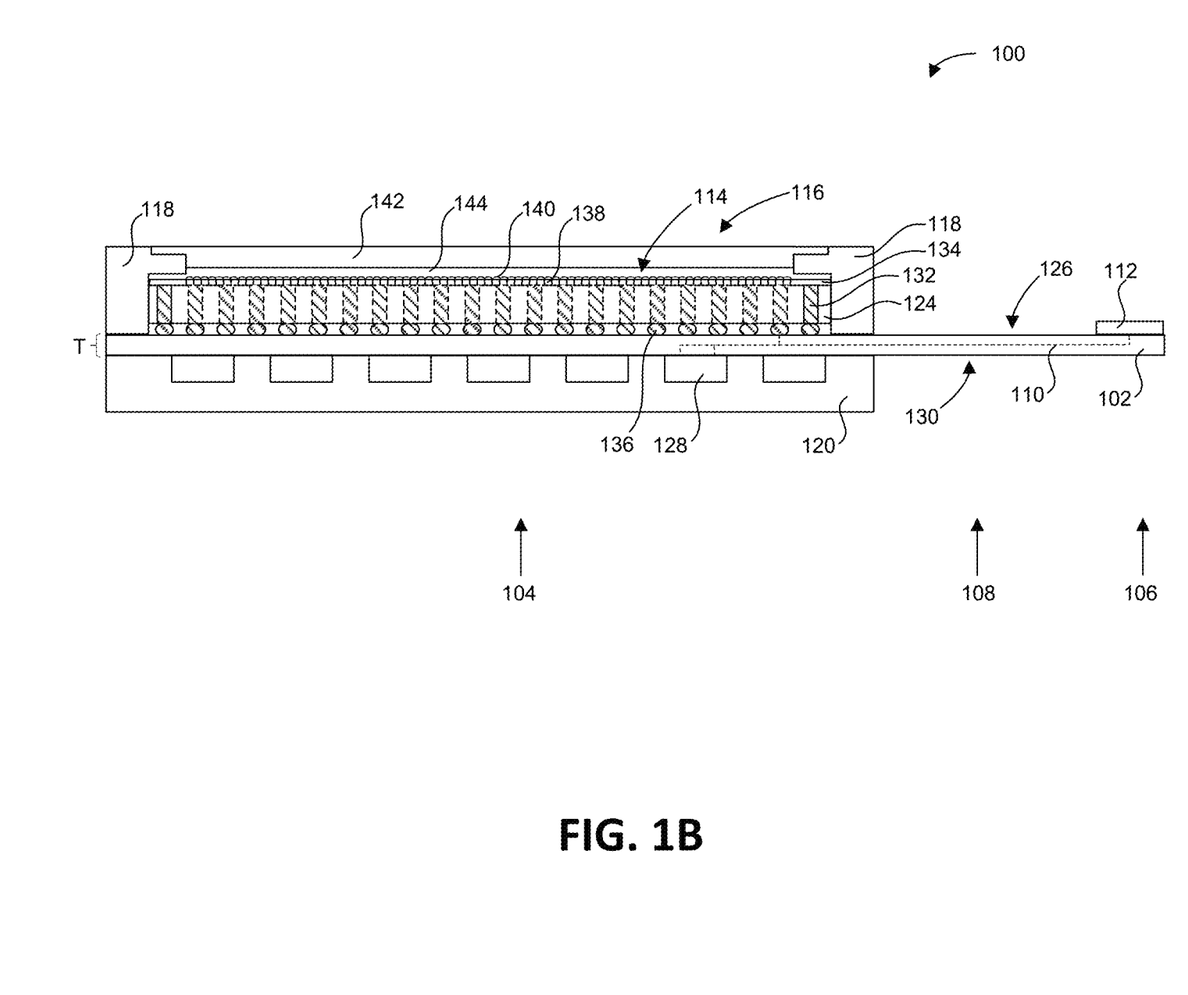
FIG. 1B illustrates a cross-sectional side view of camera module that is fabricated with flexible interconnect tape, in accordance with aspects of the disclosure.

FIG. 1B illustrates a cross-sectional side view of camera module 100, in accordance with aspects of the disclosure. In FIG. 1B, the image sensor die of camera module 100 is illustrated as image sensor die 124, and the electronic components of camera module 100 are illustrated as electronic components 128, according to an embodiment. Image sensor die 124 is coupled to a first side 126 of flexible interconnect tape 102, and electronic components 128 are coupled to a second side 130 of flexible interconnect tape 102, according to an embodiment.

Figure 2A:
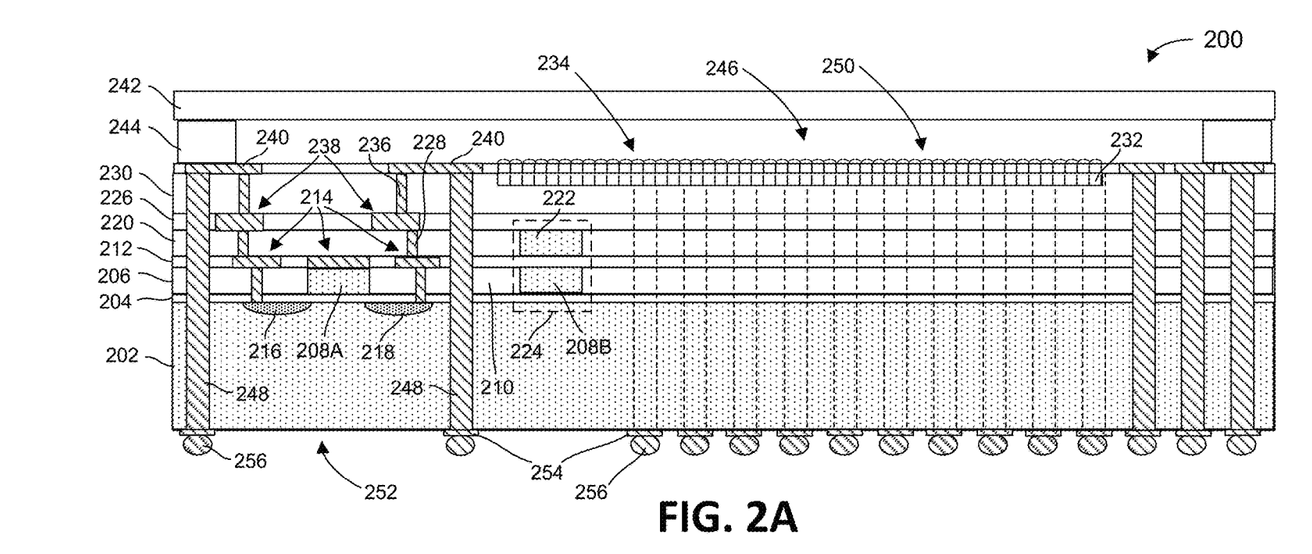
FIGS. 2A and 2B illustrate an image sensor die and a process for converting a wire bond die into a flip chip die, in accordance with aspects of the disclosure.

Image sensor die 124 is configured as a flip chip die having a number of conductive pads on a bottom surface to facilitate electrical coupling with first side 126 of flexible interconnect tape 102, according to an embodiment. Image sensor die 124 may be a wire bond die that has been modified with a number of Through Silicon Vias (TSVs) 132. TSVs 132 may form electrical connections between the two sides of image sensor die 124 that have the largest surface area (e.g., the top and bottom sides). TSVs 132 may couple bonding pads 134 on the pixel array side of image sensor die 124 (e.g., a first side of the die) to the opposite, non-pixel array side of image sensor die 124 (e.g., a second side of the die). TSVs 132 may be coupled to bonding pads or plated surfaces located on the non-pixel array side of image sensor die 124 (e.g., as shown in FIG. 2A), to support coupling to gold stud bumps 136, according to an embodiment. Gold stud bumps 136 are interconnection pads that may be implemented as stud bumps that are made from gold. In alternative implementations, gold stud bumps 136 may be implemented as gold-plated stud bumps, copper, or another alloy that enables thermo-sonic bonding or thermo-compression bonding. Gold stud bumps 136 may be applied to bonding pads or nickel/gold plated surfaces positioned over the bottom portion of TSVs 132.

Image sensor die 124 includes pixel array 114, and pixel array 114 may include a number of components. Pixel array 114 may include a number of pixels (not shown) that are each individually configured to convert light into electrical signals that can be transferred to traces 110. The pixels in pixel array 114 may be covered by a color filter array (CFA) 138 (e.g., red, green, blue) and microlenses 140, according to an embodiment. CFA 138 may be configured to filter/pass particular wavelengths of light, and microlenses 140 may be configured to focus incident light upon individual pixels in pixel array 114.

Electronic components 128 and molding 120 are configured to support operation of image sensor die 124 and are configured to provide rigidity to camera module 100, according to an embodiment. Electronic components 128 and molding 120 are configured to support operation and reduce the likelihood of damage (e.g., bending, breaking) to image sensor die 124, according to an embodiment. Electronic components 128 are coupled to traces 110 that are accessible and exposed on second side 130 of flexible interconnect tape 102, according to an embodiment. Electronic components 128 may be passive components and may include, but are not limited to, capacitors, resistors, inductors, and diodes, according to an embodiment. Molding 120 may thermally conduct heat away from electronic components 128, away from flexible interconnective tape 102, and away from image sensor die 124, according to an embodiment. Molding 120 may be configured to dissipate heat transferred from electronic components 128, flexible interconnective tape 102, and image sensor die 124, according to an embodiment.

Camera module 100 may include cover glass 142 that is configured to at least partially cover image sensor die 124, according to an embodiment. Cover glass 142 may be coupled or adhered to flexible interconnect tape 102 to cover and protect pixel array 114, according to an embodiment. Cover glass 142 may be coupled to molding 118. Cover glass 142 may be coupled to molding 118 to create an air gap 144 between pixel array 114 and cover glass 142. Air gap 144 defined by cover glass 142 may protect pixel array 114 from dirt, dust, or other obstacles.

Figure 1C:
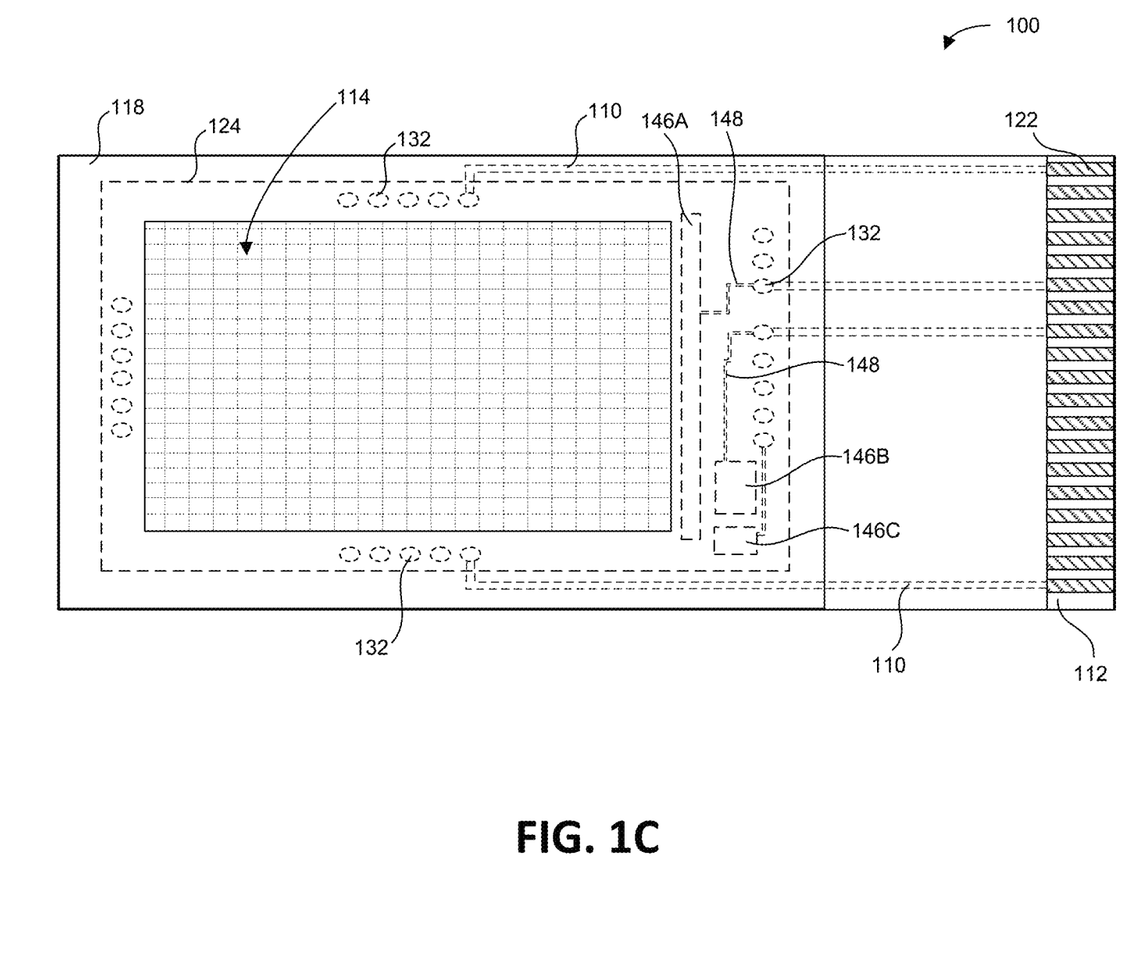
FIG. 1C illustrates an example plan view of camera module that is fabricated with flexible interconnect tape, in accordance with aspects of the disclosure.

FIG. 1C illustrates an example plan view of camera module 100, in accordance with aspects of the disclosure. As illustrated, TSVs 132 may be distributed around a periphery of pixel array 114. TSVs 132 may be coupled to various components 146 (individually, component 146A, 146B, and 146C) of image sensor die 124. Examples of components 146 may include pixel array readout circuitry, processing circuitry, volatile memory, non-volatile memory, driver circuitry, etc. TSVs 132 may be coupled to components 146 with on-chip traces 148, for example. On-chip traces 148 may be conductive connections that are on and within image sensor die 124. On-chip traces 148, TSVs 132, gold stud bumps 136, and traces 110 provide electrical coupling between pads 122 and components 146 to enable external access to features (e.g., data lines, clock signals, communication channels, etc.) of image sensor die 124, according to an embodiment.

Figure 2B:
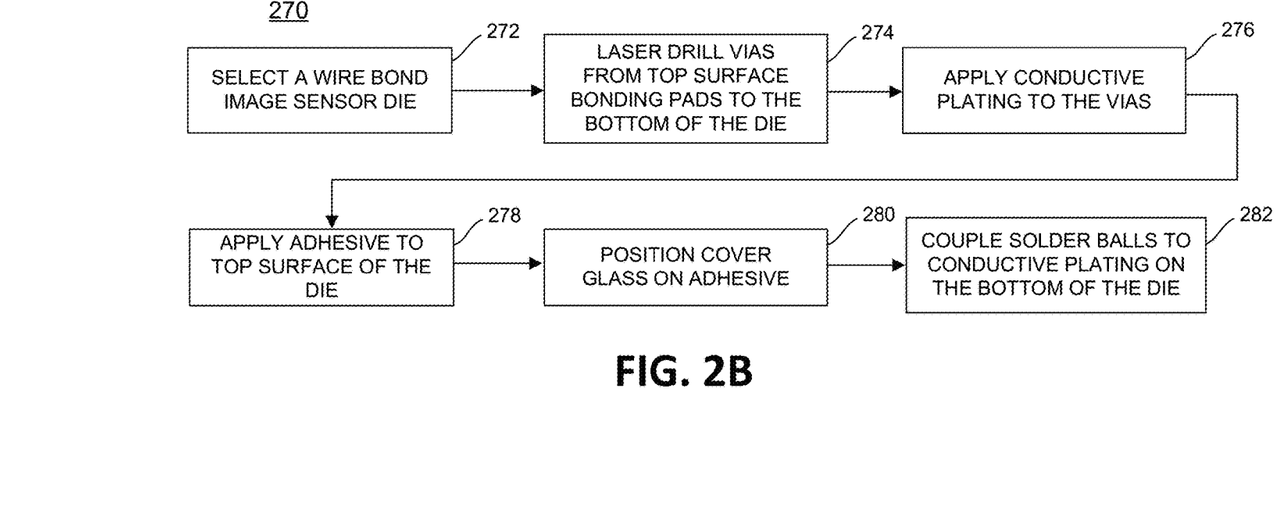

FIGS. 2A and 2B illustrate an image sensor die 200 and a process 270 for converting a wire bond die into a flip chip die, in accordance with aspects of the disclosure. Image sensor die 200 is an example implementation of image sensor die 124 (shown in FIGS. 1A, 1B, and 1C), according to an embodiment. Image sensor die 200 is an example of a wire bond die that has been converted to operate as a flip chip die, in accordance with aspects of the disclosure. In general, a wire bond image sensor die has bonding pads on the same surface as a pixel array, and a flip chip image sensor die has bonding pads on a surface that is opposite to the surface having the pixel array.

Image sensor die 200 may include a number of layers in which various circuitry are formed to support imaging operations, according to an embodiment. Image sensor die 200 may include a substrate layer 202, which may be a silicon or bulk substrate layer. Image sensor die 200 may include an insulator layer 204 formed over substrate layer 202, and insulator layer 204 may support operation of, for example, transistors. Image sensor die 200 may have a polysilicon layer 206 formed over insulator layer 204 and may include one or more deposits of polysilicon components 208 (e.g., component 208A and 208B) separated by insulator material 210. Image sensor die 200 may include a first metal layer 212 that includes metal interconnects 214 that may be, for example, configured to connect to other components such as a source 216 and a drain 218, as an example. Image sensor die 200 may include a second polysilicon layer 220 that may include polysilicon component 222. Polysilicon component 222 may be combined with other components to form a poly-poly capacitor 224 or other devices, for example. Image sensor die 200 may include a second metal layer 226 that may connect to first metal layer 212 through a number of vias 228, according to an embodiment. Second metal layer 226 may include metal interconnects 238 that may be used to couple bonding pads 240 to components on other layers of image sensor die 200. Image sensor die 200 may include a number of additional layers 230, in which pixels 232 are formed as part of pixel array 234, according to an embodiment. Additional layers 230 may include additional components such as vias 236, metal layers, insulator layers, silicon layers, etc., according to various embodiments. Bonding pads 240 may be formed on a surface level of image sensor die 200, to enable electrical coupling to external circuitry, according to an embodiment.

Image sensor die 200 may be coupled to a cover glass 242 with adhesive 244 or with molding, according to an embodiment. In an embodiment, cover glass 242 is applied to image sensor die 200 prior to partially encapsulating image sensor die 200 with molding (e.g., molding 118, shown in FIGS. 1A, 1B, and 1C). In another embodiment, cover glass 242 may be adhered to the molding (e.g., molding 118) using the molding or using an adhesive. Cover glass 242 may be suspended over pixel array 234 to form an air gap 246 over pixel array 234, according to an embodiment.

A wire bond die enables bonding from bonding pads to other components or packaging substrates from a top surface of a die. According to embodiments of the disclosure, image sensor die 200 is coupled to a flexible interconnect tape from a bottom surface using bonding pads disposed on the bottom surface of the die to reduce the stack height of a camera module in which the die is included. According to an embodiment, TSVs 248 are formed through the several layers of image sensor die 200 from a top surface 250 to a bottom surface 252 to enable image sensor die 200 to be coupled to a flexible interconnect tape from a surface that is opposite the surface of pixel array 234, according to an embodiment. TSVs 248 couple bonding pads 240 to bonding pads 254 that are applied to bottom surface 252, according to an embodiment. Bonding pads 254 may be implemented as thin plating (e.g., nickel/gold alloy plating) over openings of TSVs 248 on bottom surface 252. Bonding pads 254 are terminals that may be used for different techniques of interconnection, such as gold stud bump, copper bumps, or solder balls, according to various embodiments. Gold stud bumps 256 are coupled to bonding pads 254 to enable electrical connection from gold stud bumps 256 to components within image sensor die 200, according to an embodiment. Gold stud bumps 256 are interconnection pads that may be gold stud bumps, copper stud bumps, solder balls, alloy plated stud bumps, or gold plated stud bumps that are coupled to image sensor die 200 prior to coupling image sensor die 200 to a flexible interconnect tape.

FIG. 2B illustrates process 270 for converting a wire bond die into a flip chip die, in accordance with aspects of the disclosure. The order in which some or all of the process blocks appear in process 270 should not be deemed limiting. Rather, one of ordinary skill in the art having the benefit of the present disclosure will understand that some of the process blocks may be executed in a variety of orders not illustrated, or even in parallel.

At process block 272, process 270 selects a wire bond image sensor die, according to an embodiment. Process block 272 proceeds to process block 274, according to an embodiment.

At process block 274, process 270 laser drills vias from top surface bonding pads to the bottom of the die, according to an embodiment. Examples of top surface bonding pads include bonding pads 240. After drilling the vias, process 270 may include plating or filling the channels inside of the vias with a conductive material, such as copper, gold, or an alloy. Process block 274 proceeds to process block 276, according to an embodiment.

At process block 276, process 270 applies conductive plating to the vias, according to an embodiment. Examples of conductive plating include bonding pads 254. The conductive plating may include a nickel-gold alloy plating process that covers the bottom side of the vias (e.g., TSV 248) to protect the bottom of the die and to prepare a pad or surface for gold stud bump coupling. Process block 276 proceeds to process block 278, according to an embodiment.

At process block 278, process 270 applies adhesive to a top surface of the die, according to an embodiment. The adhesive may be the same material as the molding used to secure image sensor dice to the flexible interconnect tape. The adhesive may be electrically insulating and thermally conductive. Process block 278 proceeds to process block 280, according to an embodiment.

At process block 280, process 270 positions cover glass on the adhesive, according to an embodiment. The cover glass may be cover glass 242. Process block 280 proceeds to process block 282, according to an embodiment.

At process block 282, process 270 couples gold stud bumps to the conductive plating on the bottom surface of the die, according to an embodiment. The bottom plating may function as thin bonding pads (e.g., bonding pads 254). The gold stud bumps may be stud bumps that include gold, copper, or another alloy that enables thermo-sonic bonding or thermo-compression bonding. Process 270 terminates after process block 282, according to an embodiment.

FIGS. 3A-3F illustrate a process of fabricating camera module 100 using flexible interconnect tape, in accordance with aspects of the disclosure.

Figure 3A:
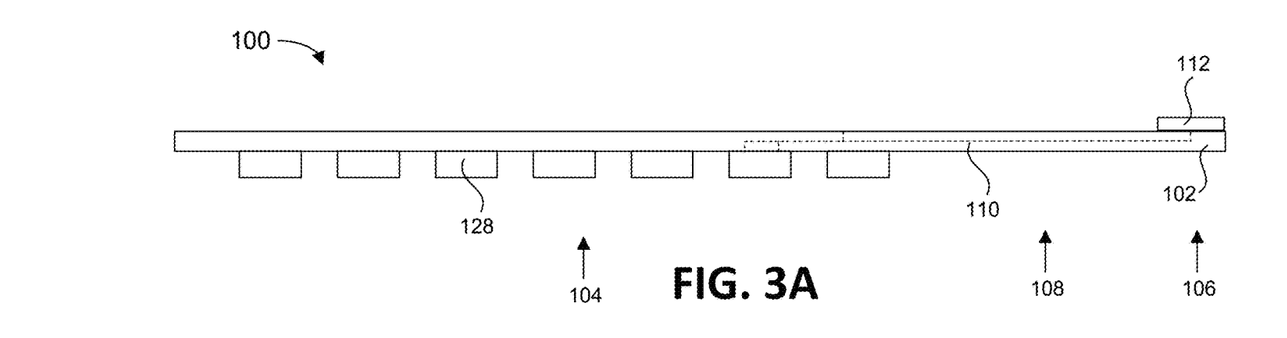
FIGS. 3A-3G illustrate a process of fabricating camera module using flexible interconnect tape, in accordance with aspects of the disclosure.

FIG. 3A illustrates mounting electronic components 128 to flexible interconnect tape 102, according to an embodiment. Electronic components 128 are passive electronic components that are coupled to exposed portions of traces 110 on image sensor end 104 of flexible interconnect tape 102, according to an embodiment. Electronic components 128 may be soldered onto flexible interconnect tape 102 using, for example, a gold (Au) and tin (Sn) alloy solder paste. Electronic components 128 may include capacitors, resistors, inductors, and diodes, for example. Electronic components 128 may have a height of 0.2 mm to 0.3 mm, for example. Coupling electronic components 128 to traces 110 electrically couples electronic components 128 to connector 112 that is positioned on connector end 106 through traces 110, according to an embodiment.

Figure 3B:
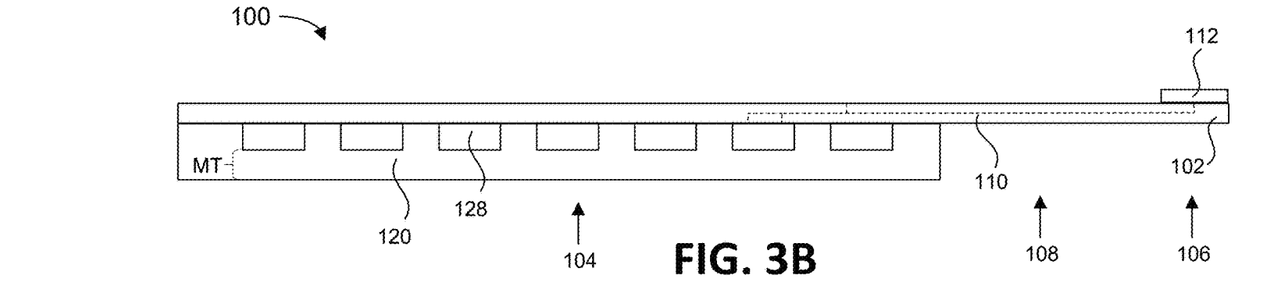

FIG. 3B illustrates the application of molding 120 over electronic components 128, according to an embodiment. Molding 120 covers and protects electronic components 128, according to an embodiment. Molding 120 provides rigidity to image sensor end 104 of flexible interconnect tape 102, according to an embodiment. Molding 120 may also transfer and dissipate heat from flexible interconnect tape 102 and from electronic components 128. A molding thickness MT over electronic components 128 may be, for example, 0.1 mm thick. In one embodiment, molding thickness MT has a value in the range of 0.05 mm-0.5 mm thick. However, the layer of molding 120 will include a thickness of the electronic components 128 in addition to molding thickness MT, so that molding 120 at least partially fills gaps between electronic components 128. Because flexible interconnect tape 102 may have a thickness or height of 0.13 mm, a solder paste may be 0.05 mm thick, electronic components 128 may be 0.2 mm-0.3 mm thick, and molding thickness MT may be 0.1 mm thick, the total thickness of these portions of camera module 100 may be 0.48-0.58 mm thick.

Figure 3C:
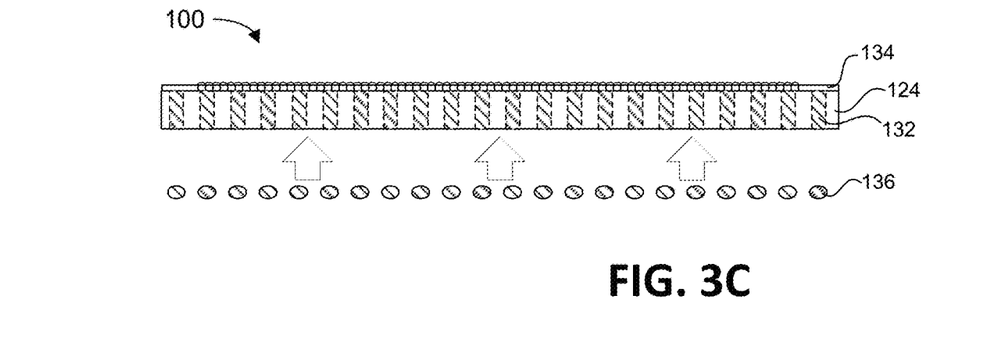

FIG. 3C illustrates coupling gold stud bumps 136 to bonding pads of image sensor die 124, according to an embodiment. Gold stud bumps 136 may be stud bumps that are gold, E-less nickel-gold plated, or another conductive element or alloy. The stud bumps may have a non-spherical shape, may be partially conical, or may be spherical (e.g., similar to a solder ball), according to various embodiments. The bonding pads or conductive plating may be added to the bottom sides of TSVs 132 in the conversion of a wire bond die to a flip chip die configuration. Alternatively, bonding pads may already exist on the bottom of an existing flip chip die.

Figure 3D:
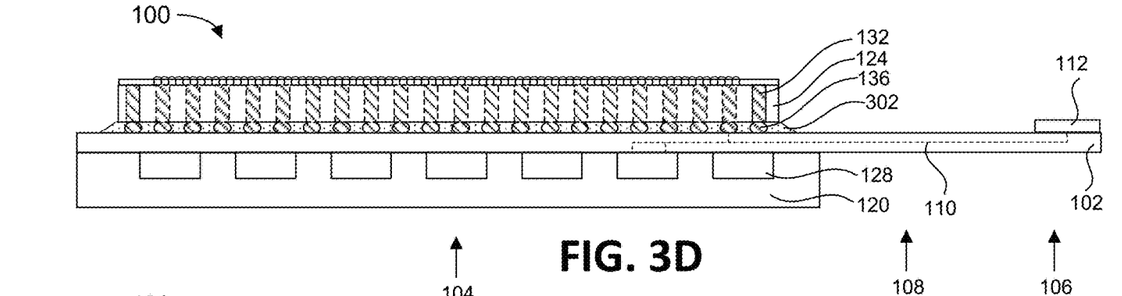

FIG. 3D illustrates the bonding of image sensor die 124 to flexible interconnect tape 102, according to an embodiment. Image sensor die 124 may be bonded to flexible interconnect tape 102 using thermo-sonic (TS) bonding or thermo-compression (TC) bonding, according to embodiments. TC bonding force can be reduced because bonding on a flexible tape surface can be performed with less force than needed for printed circuit board (PCB) materials. TS and TC bonding may include applying a conductive epoxy, a non-conductive paste (NCP), or an anisotropic conductive paste (ACP). TS bonding may then include concurrently applying heat with an ultrasonic signal to bond gold stud bumps 136 to flexible interconnect tape 102 and to cure the epoxy, NCP, or ACP. TC bonding, however, may include applying heat with compression to bond gold stud bumps 136 to flexible interconnect tape 102, according to an embodiment.

An underfill 302 may be applied between image sensor die 124 and flexible interconnect tape 102, which may thermally couple image sensor die 124 to flexible interconnect tape 102 to help dissipate heat from image sensor die 124, according to an embodiment. The underfill may be jetted beneath image sensor die 124.

Figure 3E:
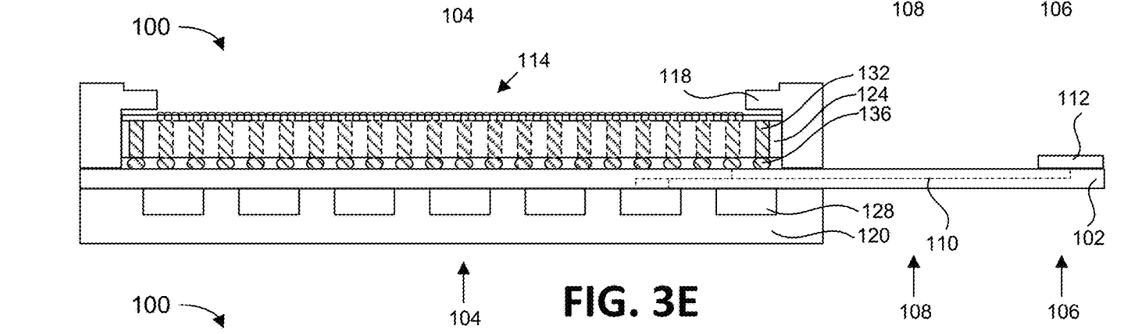

FIG. 3E illustrates applying molding 118 over portions of image sensor die 124 while maintaining exposure of pixel array 114, according to an embodiment. A mold structure may be positioned over image sensor die 124, and the mold structure may enable mold compound to be injected or transferred onto image sensor die 124 and around the periphery of pixel array 114. While molding 118 is applied, a number of image sensor dice may be restrained by a framework that enables automated fabrication of numerous camera modules at the same time. The camera modules may be singulated (e.g., individually separated from the framework) after receiving molding 118 or after another process, according to various embodiments.

Figure 3F:
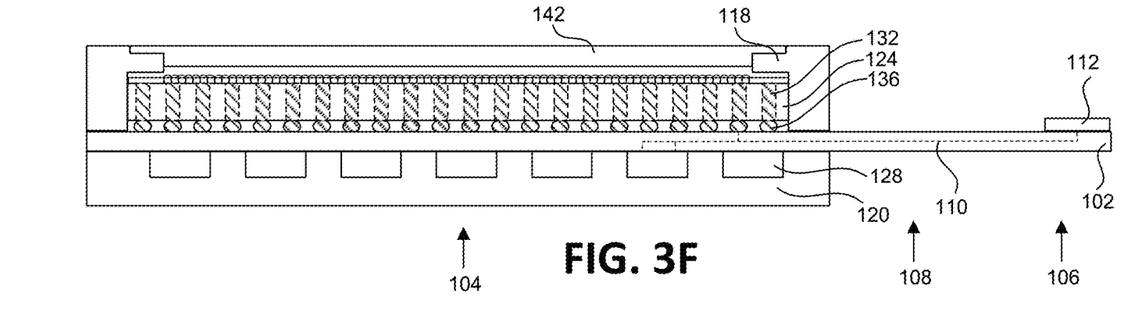

FIG. 3F illustrates applying cover glass 142 over pixel array 114 to protect pixel array 114, according to an embodiment. Cover glass 142 may be adhered to flexible interconnect tape 102, to molding 118, or to image sensor die 124 with an adhesive, according to various embodiments.

Figure 3G:
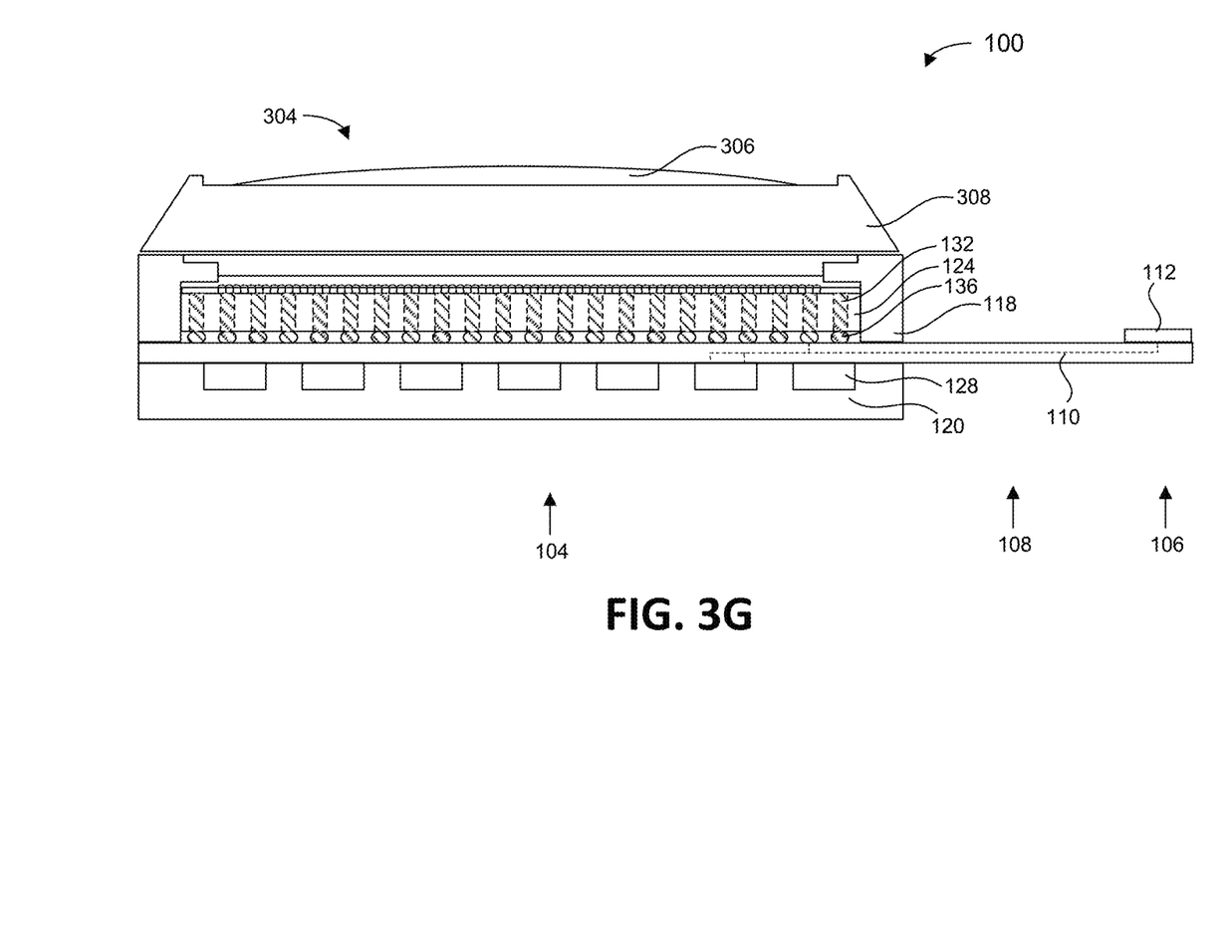

FIG. 3G illustrates the addition of a lens assembly 304 to camera module 100, according to an embodiment. Lens assembly 304 may be configured to focus incident light onto pixel array 114. Lens assembly 304 may include a lens 306 and a body 308 that suspends lens 306 a pre-determined distance from pixel array 114, according to an embodiment. Lens assembly 304 may be attached using an active alignment (AA) process, which includes use of machine vision, pictures of camera modules, and/or alignment markers on portions of camera module 100, in an embodiment.

Figure 4:
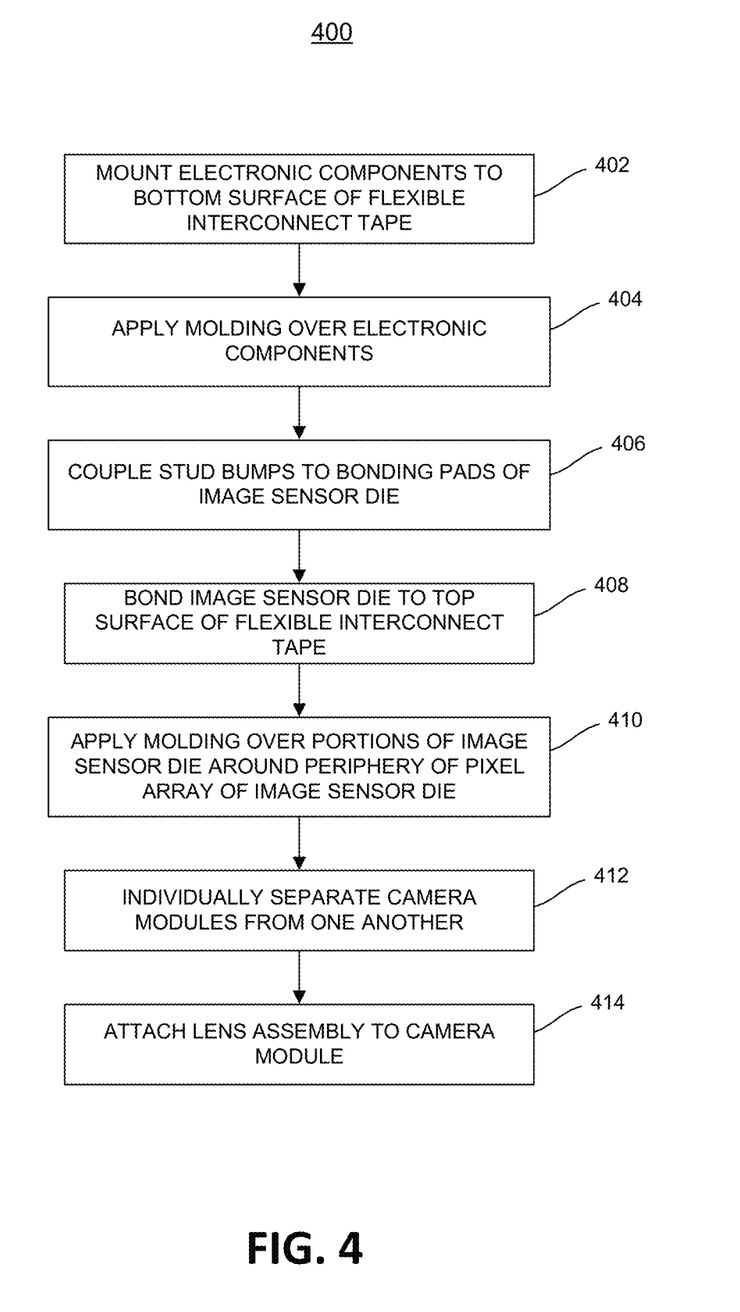
FIG. 4 illustrates process for fabricating a camera module using flexible interconnect tape, in accordance with aspects of the disclosure.

FIG. 4 illustrates process 400 for fabricating a camera module using flexible interconnect tape, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

At process block 402, process 400 mounts electronic components to a bottom surface of a flexible interconnect tape, according to an embodiment. Process block 402 proceeds to process block 404, according to an embodiment.

At process block 404, process 400 applies molding over the electronic components, according to an embodiment. Process block 404 proceeds to process block 406, according to an embodiment.

At process block 406, process 400 couples stud bumps (e.g., gold stud bumps) to bonding pads of an image sensor die, according to an embodiment. The bonding pads may be on a surface that is opposite to the surface having the pixel array, according to an embodiment. Process block 406 proceeds to process block 408, according to an embodiment.

At process block 408, process 400 bonds image sensor die to a top surface of the flexible interconnect tape, according to an embodiment. Process block 408 proceeds to process block 410, according to an embodiment.

At process block 410, process 400 applies molding over portions of image sensor die around a periphery of a pixel array of the image sensor die, according to an embodiment. Process block 410 proceeds to process block 412, according to an embodiment.

At process block 412, process 400 individually separates camera modules from one another, according to an embodiment. Process block 412 proceeds to process block 414, according to an embodiment.

At process block 414, process 400 attaches a lens assembly to the camera module. Process 400 may terminate after process block 414, according to an embodiment.

Figure 5:
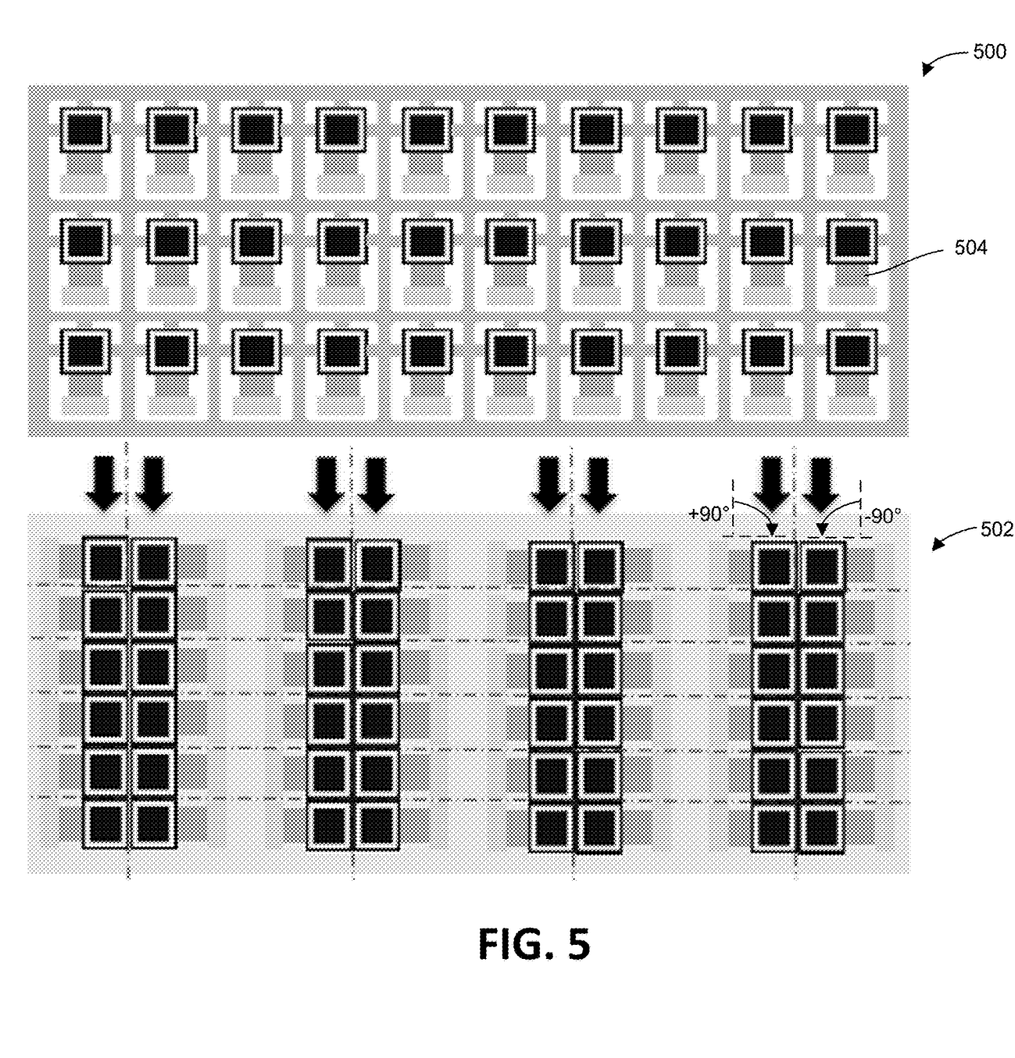
FIG. 5 illustrates two fabrication structures for orienting camera modules during fabrication, in accordance with aspects of the disclosure.

FIG. 5 illustrates a fabrication structure 500 and a fabrication structure 502 for orienting camera modules 504 during fabrication, in accordance with aspects of the disclosure. Fabrication structure 500 carries camera modules 504 with the same orientation. Fabrication structure 502 is an example of an improved manufacturing lattice structure that enables over 50% more camera modules 504 to be fabricated in a similarly sized (e.g., same sized) lattice structure, according to an embodiment. For example, fabrication structure 500 may carry 30 modules, whereas fabrication structure 502 may be able to carry 48 modules. Fabrication structure 502 includes camera modules being rotated +90° and −90° so that image sensor ends of the modules are positioned near another image sensor end, for example. Fabrication structure 502 may enable mold compound to be transferred from a single side rail or gate to inject molding material onto all of the camera modules carried by fabrication structure 502, according to an embodiment.

Figure 6:
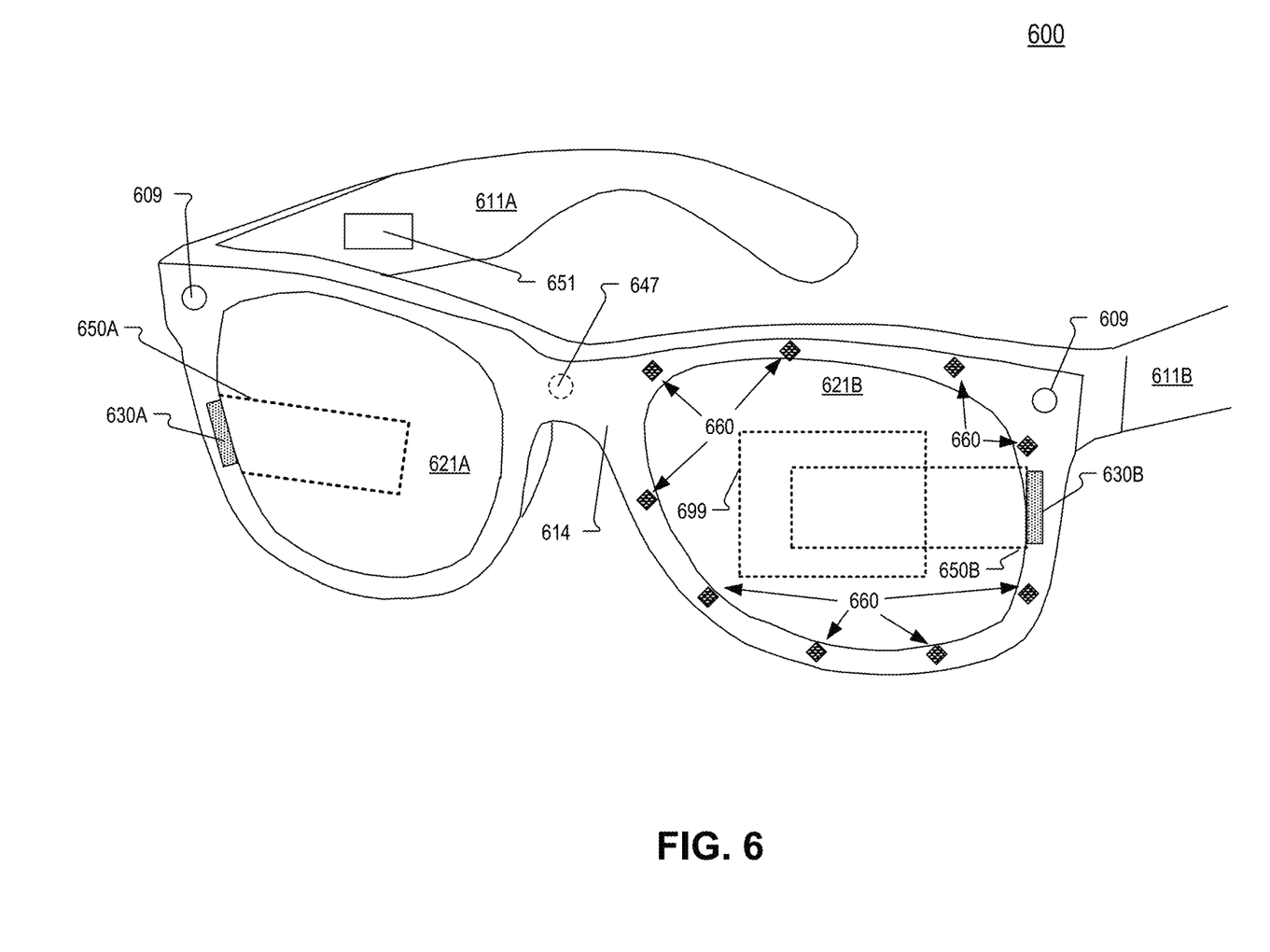
FIG. 6 illustrates a head mounted display (HMD) that includes a camera module fabricated with flexible interconnect tape, in accordance with aspects of the disclosure.

FIG. 6 illustrates a head mounted display (HMD) 600 that includes a camera module 609 fabricated with flexible interconnect tape, in accordance with aspects of the disclosure. HMD 600 includes frame 614 coupled to arms 611A and 611B. Lenses 621A and 621B are mounted to frame 614. Lenses 621 may be prescription lenses matched to a particular wearer of HMD or non-prescription lenses. The illustrated HMD 600 is configured to be worn on or about a head of a user of the HMD.

In FIG. 6, each lens 621 includes a waveguide 650 to direct image light generated by a display 630 to an eyebox area for viewing by a wearer of HMD 600. Display 630 may include an LCD, an organic light emitting diode (OLED) display, micro-LED display, quantum dot display, pico-projector, or liquid crystal on silicon (LCOS) display for directing image light to a wearer of HMD 600.

The frame 614 and arms 611 of the HMD 600 may include supporting hardware of HMD 600. HMD 600 may include any of processing logic 651, wired and/or wireless data interface for sending and receiving data, graphic processors, and one or more memories for storing data and computer-executable instructions. In one embodiment, HMD 600 may be configured to receive wired power. In one embodiment, HMD 600 is configured to be powered by one or more batteries. In one embodiment, HMD 600 may be configured to receive wired data including video data via a wired communication channel. In one embodiment, HMD 600 is configured to receive wireless data including video data via a wireless communication channel.

Lenses 621 may appear transparent to a user to facilitate augmented reality or mixed reality where a user can view scene light from the environment around her while also receiving image light directed to her eye(s) by waveguide(s) 650. Consequently, lenses 621 may be considered (or include) an optical combiner. In some embodiments, image light is only directed into one eye of the wearer of HMD 600. In an embodiment, both displays 630A and 630B are included to direct image light into waveguides 650A and 650B, respectively.

The example HMD 600 of FIG. 6 includes an array of infrared emitters (e.g. infrared LEDs) 660 disposed around a periphery of lens 621B in frame 614. The infrared emitters emit light in an eyeward direction to illuminate an eye of a wearer of HMD 600 with infrared light. In one embodiment, the infrared light is centered around 850 nm. Infrared light from other sources may illuminate the eye as well. The infrared light may reflect off the eye and be received by a Fresnel reflector 699 selectively coated with a hot mirror and configured to direct and focus the reflected infrared light to camera 647. Fresnel reflector 699 may have an off-axis Fresnel lensing shape to direct the reflected infrared light to camera 647. In this way, camera 647 is able to image the eye of a wearer of HMD 600. Camera 647 may be mounted on the inside of the temple of HMD 600. The images of the eye captured by camera 647 may be used for eye-tracking purposes. Although camera 647, infrared emitters 660, and Fresnel reflector 699 are illustrated on only one side of HMD 600, they of course may be duplicated on the other side of HMD 600 to facilitate infrared imaging of both eyes of a wearer of HMD 600.

Camera module 609 may be outward facing to support HMD 600 operations. For example, camera module 609 may be used to provide pass-through imaging that enables a user to temporarily see the surrounding environment prior to, for example, engaging in fully immersive VR experiences.

Camera module 609 may be outward facing to support artificial intelligence (AI) identification of one or more people, places, landmarks, and/or objects in an environment, according to an embodiment. Camera 647 and camera module 609 may be example implementations of the embodiments of camera modules disclosed throughout the present disclosure.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera module, comprising:
an image sensor die having a first side and a second side, wherein the first side includes a pixel array, wherein the second side includes a plurality of bonding pads, wherein the second side is a non-pixel array side of the image sensor die opposite to the first side that is a pixel array side of the image sensor die;
high-density interconnect (HDI) tape coupled to the image sensor, wherein the HDI tape includes flexible layers of insulator material, a plurality of traces, a first side, and a second side, wherein the first side of the HDI tape is electrically coupled to the second side of the image sensor die;
a plurality of passive electronic components electrically coupled to the second side of the HDI tape; and
a plurality of stud bumps positioned between the non-pixel array side of the image sensor die and the HDI tape to electrically couple the image sensor die to the HDI tape.

2. The camera module of claim 1 further comprising:
a layer of molding disposed on the second side of the HDI tape, wherein the layer of molding is disposed over the plurality of passive electronic components, wherein the layer of molding is configured to provide rigidity to at least part of the camera module.

3. The camera module of claim 2, wherein a thickness of a portion of the layer of molding that covers the plurality of passive electronic components is approximately 0.1 mm, wherein a combined thickness of one of the plurality of passive electronic components and the layer of molding is approximately 0.3-0.4 mm.

4. The camera module of claim 1 further comprising:
a layer of molding disposed on the first side of the HDI tape, wherein the layer of molding is at least partially disposed over the image sensor die to adhere the image sensor die to the HDI tape.

5. The camera module of claim 4, wherein the layer of molding is disposed around a periphery of the pixel array.

6. The camera module of claim 1, wherein the image sensor die is configured as a flip chip die.

7. The camera module of claim 6, wherein the image sensor die includes a wire bond die that is configured as the flip chip die, wherein the image sensor die includes a plurality of Through Silicon Vias (TSVs) that extend from the first side of the image sensor die to the second side of the image sensor die.

8. The camera module of claim 1 further comprising:
an underfill deposited between the image sensor die and the HDI tape.

9. The camera module of claim 1, wherein the passive electronic components include one or more of capacitors, resistors, and inductors.

10. The camera module of claim 1, wherein the HDI tape has a thickness of approximately 0.13-0.18 mm.

11. A head mounted device, comprising:
a frame;
a display coupled to the frame;
a camera module coupled to the frame, wherein the camera module includes:
an image sensor die having a first side and a second side, wherein the first side includes a pixel array, wherein the second side includes a plurality of bonding pads, wherein the second side is a non-pixel array side of the image sensor die opposite to the first side that is a pixel array side of the image sensor die;
high-density interconnect (HDI) tape coupled to the image sensor, wherein the HDI tape includes flexible layers of insulator material, a plurality of traces, a first side, and a second side, wherein the first side of the HDI tape is electrically coupled to the second side of the image sensor die by way of the bonding pads on the non-pixel array side of the image sensor die;
a plurality of passive electronic components electrically coupled to the second side of the HDI tape; and
a plurality of stud bumps positioned between the non-pixel array side of the image sensor die and the HDI tape to electrically couple the image sensor die to the HDI tape; and
one or more processors coupled to the camera module and configured to receive image data from the camera module.

12. The head mounted device of claim 11 further comprising:
a layer of molding disposed on the second side of the HDI tape, wherein the layer of molding is disposed to cover the plurality of passive electronic components, wherein the layer of molding is configured to provide rigidity to at least part of the camera module.

13. The head mounted device of claim 12, wherein a thickness of a portion of the layer of molding that covers the plurality of passive electronic components is approximately 0.1 mm, wherein a combined thickness of one of the plurality of passive electronic components and the layer of molding is approximately 0.3-0.4 mm.

14. The head mounted device of claim 11 further comprising:
a layer of molding disposed on the first side of the HDI tape, wherein the layer of molding is at least partially disposed over the image sensor die.

15. The head mounted device of claim 14, wherein the layer of molding is disposed around a periphery of the pixel array.

16. The head mounted device of claim 11, wherein the image sensor die includes a wire bond die that is configured as a flip chip die, wherein the image sensor die includes a plurality of Through Silicon Vias (TSVs) that extend from the first side of the image sensor die to the second side of the image sensor die.

17. A method of fabricating a camera module using high density interconnect (HDI) tape, the method comprising:
electrically coupling a plurality of passive electronic components to a first side of the HDI tape, wherein the HDI tape includes flexible layers of insulator material and a plurality of conductive traces disposed between at least two layers of flexible insulator material;
depositing first molding on the first side of the HDI tape to cover the plurality of passive electronic components;
electrically coupling an image sensor die to a second side of the HDI tape, wherein the image sensor includes a pixel array and is configured as a flip chip die; and
depositing second molding on the second side of the of the HDI tape and around a periphery of the pixel array.

18. The method of claim 17, wherein electrically coupling the image sensor die to the second side of the HDI tape includes thermo-sonic bonding or thermo-compression bonding the image sensor die to the second side of the HDI tape, wherein a plurality of gold stud bumps are positioned between the image sensor die and the second side of the HDI tape.

19. The method of claim 17 further comprising:
converting the image sensor die from a wire bond die to the flip chip die by fabricating Through Silicon Vias (TSVs) from a first side of the image sensor die to a second side of the image sensor die.

* * * * *